United States Patent [19]

Morris et al.

[11] Patent Number: 4,728,719

[45] Date of Patent: Mar. 1, 1988

[54] POLYESTERS OF TRANS-4,4'-STILBENEDICARBOXYLIC ACID, 1,6-HEXANEDIOL, AND ETHYLENE GLYCOL

[75] Inventors: John C. Morris; Winston J. Jackson, Jr., both of Kingsport, Tenn.

[73] Assignee: Eastman Kodak Company, Rochester, N.Y.

[21] Appl. No.: 25

[22] Filed: Jan. 2, 1987

[51] Int. Cl.$^4$ ............................................. C08G 63/52
[52] U.S. Cl. ..................................... 528/306; 528/272; 528/302; 528/303
[58] Field of Search ................ 528/272, 302, 303, 306

[56] References Cited

U.S. PATENT DOCUMENTS 4,387,214 6/1983 Passmore et al. .................... 528/296
4,414,382 11/1983 Morris et al. ........................ 528/298

Primary Examiner—Lucille M. Phynes
Attorney, Agent, or Firm—John F. Stevens; William P. Heath, Jr.

[57] ABSTRACT

The polyesters of trans-4,4'-stilbenedicarboxylic acid, 95–60 mol % 1,6-hexanediol, and 5–40 mol % ethylene glycol can be injection-molded to give shaped objects having exceptionally high tensile strength and stiffness. Many of the copolyesters of this invention have excellent chemical resistance and good hydrolytic stability. The copolyesters can be injection-molded, spun into fiber, or extruded into film having these properties.

7 Claims, No Drawings

POLYESTERS OF TRANS-4,4'-STILBENEDICARBOXYLIC ACID, 1,6-HEXANEDIOL, AND ETHYLENE GLYCOL

TECHNICAL FIELD

This invention relates to high molecular weight polyesters which are useful as films, fibers, and molding plastics. This invention is particularly concerned with copolyesters from trans-4,4'-stilbenedicarboxylic acid, 1,6-hexanediol, and ethylene glycol.

BACKGROUND OF THE INVENTION

U.S. Pat. No. 2,657,195 broadly discloses polyesters of various stilbenedicarboxylic acid isomers with glycols, aminoalcohols, and diamines. Various glycols are disclosed containing 2 to 16 carbon atoms, but copolyesters of 1,6-hexanediol and ethylene glycol are not specifically disclosed.

U.S. Pat. No. 3,496,839 relates to low molecular weight homopolymers of 4,4'-stilbenedicarboxylic acid and aliphatic glycols useful in radiation-cured crosslinked polyester coatings. Column 2, lines 20 to 44, contain a general listing of the glycols useful in these coatings. No examples are given using a combination of 1,6-hexanediol and ethylene glycol. Neither U.S. Pat. No. 2,657,195 nor U.S. Pat. No. 3,496,839 distinguishes one stilbenedicarboxylic acid isomer from another, i.e., 4,4'- from 3,3'- or cis- from trans-, etc.

Our own U.S. Pat. No. 4,420,607 (issued Dec. 13, 1983), U.S. Pat. No. 4,459,402 (issued Feb. 10, 1984), U.S. Pat. No. 4,468,510 (issued Aug. 28, 1984), U.S. Pat. No. 4,526,822 (issued July 2, 1985) all disclose polyesters based on trans-4,4'-stilbenedicarboxylic acid using various glycols. No exaples of copolyesters based on the glycols claimed herein are specifically disclosed.

Our U.S. Pat. No. 4,551,520 discloses copolyesters based on terephthalic acid, trans-4,4'-stilbenedicarboxylic acid and 1,4-cyclohexanedimethanol.

Other patents which disclose trans-4,4'-stilbenedicarboxylic acid are Japanese Kokai No. 72348/74 and U.S. Pat. Nos. 2,657,194; 3,190,174; 3,247,043; 3,842,040; 3,842,041 and 4,073,777. Polyesters of trans-4,4'-stilbenedicarboxylic acid and neopentyl glycol, 1,5-pentanediol, 1,6-hexanediol, and 1,10-decanediol are disclosed by Meurisse, et al., in the *British Polymer Journal*, Vol. 13, 1981, page 57 (Table 1). Jackson and Morris disclose homopolyesters from trans-4,4'-stilbenedicarboxylic acid and various aliphatic glycols in the *Journal of Applied Polymer Science, Applied Polymer Symposia*, 41, 307-326 (1985). Our copending applications filed of even date herewith entitled "Polyesters of trans-4,4'-Stilbenedicarboxylic Acid, 1,4-Butanediol and 1,6-Hexanediol", and "Polyesters of trans-4,4'-Stilbenedicarboxylic Acid, 1,4-Butanediol, and Ethylene Glycol" also disclose polyesters based on trans-4,4'-stilbenedicarboxylic acid. No examples of copolyesters based on stilbenedicarboxylic acid, 1,6-hexanediol and ethylene glycol are specifically disclosed.

DISCLOSURE OF THE INVENTION

The prior art discloses molding, spinning, and extrusion into film as viable processes for shaping polymers based on stilbenedicarboxylic acid. We have discovered copolyesters based on trans-4,4'-stilbenedicarboxylic acid, 1,6-hexanediol, and ethylene glycol having a combination of high tensile, impact and flexural strengths, high flexural modulus, good processability, and good chemical resistance.

According to the present invention, there are provided copolyesters comprising repeating units from at least 80 mol % trans-4,4'-stilbenedicarboxylic acid, repeating units from about 95–60 (preferably 95–65) mol % 1,6-hexanediol and repeating units from about 5–40 (preferably 5–35) mol % ethylene glycol, the total mol % of acid components and glycol, components each being 100 mol %, and the polyester having an inherent viscosity of 0.3 or more determined at 25° C. in 25/35/40 (wt/wt/wt) phenol/tetrachloroethane/p-chlorophenol at a concentration of 0.1 g/100 mL.

Injection-molded bars consisting of copolyesters having repeating units from 100 mol % trans-4,4'-stilbenedicarboxylic acid (SDA), repeating units from about 95 to about 60 mol % 1,6-hexanediol (HD), and repeating units from about 5 to about 40 mol % ethylene glycol (EG) units have outstanding tensile strength (Table 1). The homopolyester of SDA and HD had a tensile strength of 20,700 psi. Modification of this homopolyester with as little as 5 mol % EG raises the tensile strength over 50% to 34,300 psi.

The data in Table 1 also show that many of the copolyesters have increased notched Izod impact strength. Copolyesters containing about 14 to 30 mol % ethylene glycol have about twice the notched Izod impact strength of the unmodified homopolyester. Copolyesters containing greater than 40 mol % EG are too high melting to be melt processed (melting points above 300° C.).

In addition, the polyesters of this invention have excellent solvent resistance. Injection-molded bars are unaffected after exposure for 24 hrs. to toluene, 1,2-dichloroethane, methyl isobutyl ketone, ethyl acetate, ethanol, water, 20% sulfuric acid, 10% sodium hydroxide, regular grade gasoline, acetone, acetic acid, 5% Chlorox bleach, 50/50 water/ethanol, benzyl alcohol, 10% nitric acid and methylene chloride.

The polyesters of this invention are prepared from trans-4,4'-stilbenedicarboxylic acid and/or its esters, 1,6-hexanediol, and ethylene glycol. Examples of useful esters are the dimethyl, diethyl, dibutyl, diphenyl, etc. or any combination of these mixed esters. The polyesters may also be prepared from glycol esters or half-ester half-acid derivatives of trans-4,4'-stilbenedicarboxylic acid.

The trans-4,4'-stilbenedicarboxylic acid portion of the polymers may contain minor amounts of other aromatic dicarboxylic acids such as terephthalic acid, isophthalic acid, 1,5-, 1,4-, 2,6-, or 2,7-naphthalenedicarboxylic acid, 4,4'-biphenyldicarboxylic acid, and the like. The dicarboxylic acid portion of the polymer may also contain minor amounts of aliphatic dicarboxylic acids such as malonic, succinuc, glutaric, adipic, pimelic, suberic, azelaic, sebacic, cis- or trans-1,4-cyclohexanedicarboxylic, or dodecanedicarboxylic acid. These polyesters may contain up to about 20 mol % of these other dicarboxylic acids such that the sum of the dicarboxylic acid components is equal to 100 mol %. Essentially pure trans-4,4'-stilbenedicarboxylic is preferred.

The glycol portion of these polymers may contain minor amounts (not exceeding about 20 mol %) of other glycols such that the sum of the glycol components is equal to 100 mol %. Examples of useful glycols are 1,2-propanediol, 1,3-propanediol, 2,2-dimethyl-1,3-propanediol, trans- or cis-2,2,4,4-tetramethyl-1,3- cyclobutanediol, 1,4-butanediol, 1,5-pentanediol, 1,3- or 1,4-cyclohexanedimethanol, or p-xylenediol.

In addition, polyamides, such as nylon 6,6, the poly(ether-imides) such as Ultem poly(ether-imide), polyphenylene oxides such as poly(2,6-dimethylphenylene oxide) or polyphenylene oxide/polystyrene blends such as Noryl, polyesters, poly(estercarbonates), polycarbonates such as Lexan, polysulfones, poly(sulfone-ethers), and poly(etherketones) of aromatic dihydroxy compounds may be used as blend modifiers to modify the properties of the copolyesters of this invention.

The copolyesters of this invention may contain antioxidants, conventional flame retardants such as phosphorus or halogen compounds, fillers such as talc or mica, or reinforcing agents such as glass fiber or carbon fiber.

The inherent viscosity of the copolyesters of this invention are at least 0.3 and preferably 0.6 or more. The copolyesters are prepared in the melt or by solid-phase polymerization or by a combination of these processes well known to those skilled in the art.

The examples which follow are submitted for a better understanding of the invention. The examples illustrate the exceptionally high tensile strengths of the copolyesters of this invention (Table 1).

The inherent viscosities are determined at 25° C. in 25/35/40 (wt/wt/wt) phenol/tetrachloroethanol/p-chlorophenol at a concentration of 0.1 g/100 mL.

The polyesters are ground to pass a 3-mm screen, dried at 100° C. in a vacuum oven for 24 hrs., and injection molded on a 1-oz. Watson Stillman molding machine to give 1/16-in. thick D1822 Type L tensile bars and 5×½×⅛-in. flexure bars. The tensile strength is determined by taking an average of five breaks following the procedure of ASTM D638 and notched Izod impact strength is determined using the procedure of ASTM D256.

Example 1 illustrates the preparation of a polymer consisting of 100 mol % trans-4,4'-stilbenedicarboxylic acid units, 86 mol % 1,6-hexanediol units, and 14 mol % ethylene glycol units.

EXAMPLE 1

A mixture of 118.5 g. (0.40 mol) dimethyl trans-4,4'-stilbenedicarboxylate, 52.0 g (0.44 mol), 1,6-hexanediol, 22.4 g (0.36 mol) ethylene glycol, and 0.14 g titanium tetraisopropoxide (100 ppm Ti) is placed in a 500 ml flask equipped with an inlet for nitrogen, a metal stirrer, and a short distillation column. The flask is heated at 190°–200° C. for about 2 ¼ hrs. The temperature is raised gradually to 275° C. over the next ½ hr. and held for 25 minutes. The temperature is raised to 300° C. for 20 minutes. A vacuum of 0.5 mm is applied slowly as the temperature is raised to 310° C. A high melt viscosity fibrous polymer is obtained with an I.V. of 1.30. Injection-molded tensile bars have a tensile strength of 28,200 psi.

The remaining polymers in Table 1 are prepared according to the procedure of Example 1.

TABLE 1

Molding Plastic Properties of Copolyesters of trans-4,4'-Stilbenedicarboxylic Acid, 1,6-Hexanediol, and Ethylene Glycol

| $HD^a$ Content, Mol % | $EG^a$ Content, Mol % | Molding$^b$ Temp., C. | I.V. Before Molding$^c$ | I.V. After Molding$^c$ | Tensile Strength, $10^3$ psi | Notched Izod Impact Strength, ft-lb/in. |
|---|---|---|---|---|---|---|
| 100 | 0 | 265 | 1.41 | $1.21^d$ | 20.7 | 6.1 |
| 95 | 5 | 250 | 1.42 | 1.10 | 34.3 | 5.5 |
| 86 | 14 | 240 | 1.30 | 0.93 | 28.2 | 10.8 |
| 74 | 26 | 250 | 1.36 | 1.37 | 27.1 | 15.5 |
| 70 | 30 | 280 | 1.10 | 1.12 | 28.1 | 12.2 |
| 67 | 33 | 295 | 1.22 | 1.20 | 29.2 | 8.8 |
| 64 | 36 | 285 | 1.24 | 1.06 | 26.4 | 2.8 |
| 56 | 44 | $e$ | — | — | — | — |

$^a$HD and EG contents were determined by proton NMR spectroscopy.
$^b$The polymers were molded on a 1-oz. Watson-Stillman molding machine.
$^c$Inherent viscosities were determined in 25/35/40 phenol/tetrachloroethane/p-chlorophenol at a concentration of 0.1 g/100 mL at 25° C.
$^d$Insoluble material was reported during the I.V. determination.
$^e$This polymer solidified during preparation in the melt at 315° C. and cannot be molded without excessive decomposition.
Codes:
SDA = trans-4,4'-stilbenedicarboxylic acid
HD = 1,6-hexanediol
EG = ethylene glycol Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. A copolyester comprising repeating units from at least 80 mol % trans-4,4'-stilbenedicarboxylic acid, repeating units from about 95–60 mol %, 1,6-hexanediol and repeating units from about 5–40 mol % ethylene glycol, the total mol % of acid components and glycol components each being 100 mol %, and said polyester having an inherent viscosity of 0.3 or more determined at 25° C. in 25/35/40 (wt/wt/wt) phenol/tetrachloroethane/p-chlorophenol at a concentration of 0.1 g/100 mL.

2. A copolyester according to claim 1 wherein the trans-4,4'-stilbenedicarboxylic acid is present in an amount of about 100 mol %.

3. A copolyester according to claim 1 wherein the acid component comprises up to 20 mol % of at least one other aromatic dicarboxylic acid having 8 to 20 carbon atoms.

4. A copolyester according to claim 1 wherein the I.V. is greater than 0.6.

5. A fiber comprising the copolyester of claim 1.

6. A film comprising the copolyester of claim 1.

7. A molded object comprising the copolyester of claim 1.